United States Patent [19]

Kitagawa et al.

[11] Patent Number: 4,726,435
[45] Date of Patent: Feb. 23, 1988

[54] LOAD CELL WEIGHING APPARATUS

[75] Inventors: Tohru Kitagawa; Sadao Ohyoshi; Yasuhiro Ushijima, all of Mishima, Japan

[73] Assignee: Tokyo Electric Co., Ltd., Tokyo, Japan

[21] Appl. No.: 861,559

[22] Filed: May 9, 1986

[30] Foreign Application Priority Data

May 16, 1985 [JP] Japan .................................. 60-104751

[51] Int. Cl.⁴ ..................... G01G 21/10; G01G 23/02; G01G 3/08
[52] U.S. Cl. .................................... 177/187; 177/154; 177/229
[58] Field of Search ................ 177/187, 189, 154, 229

[56] References Cited

U.S. PATENT DOCUMENTS 4,058,179 11/1977 Price ............................... 177/187 X
4,611,677 9/1986 Yu ...................................... 177/187

Primary Examiner—George H. Miller, Jr.
Attorney, Agent, or Firm—Frishauf, Holtz, Goodman & Woodward

[57] ABSTRACT

A load cell weighing apparatus includes a load cell having one end secured to a base, a receiving member secured to the other end of the load cell, and a load supporting member movable with respect to the base and receiving member, wherein a load to be weighed is applied to the load supporting member. Springs are provided between the load supporting member and receiving member for transmitting the load applied to the load supporting member to the receiving member, and a stopper cooperates with the base to define the full stroke of movement of the load supporting member.

9 Claims, 6 Drawing Figures

LOAD CELL WEIGHING APPARATUS

BACKGROUND OF THE INVENTION

This invention relates to a load cell weighing apparatus, in which the weight of a load is applied to a load cell via a load supporting member, and electrical detection of a deformation of the load cell at this time is electrically detected so that the weight of load is displayed in predetermined units of weight.

The load cell weighing apparatus of the type noted above has been well known in the art. In the well-known load cell weighing apparatus, one end of a load cell is secured to a base, and the other end of the load cell is secured to a receiving member. A load supporting member, to which the weight of a load is exerted, is directly secured to the receiving member. A stopper is further secured to the receiving member such that it faces the base at a slight gap therefrom to define the stroke of displacement of the load supporting member.

When a load is applied to the load supporting member in the load cell weighing apparatus of this structure, the load cell undergoes a deformation. The extent of deformation is electrically detected, is converted to a value with the predetermined units of weight, and is displayed by the converted value. When a load enough to destroy the load cell is applied, the stopper is brought into contact with the base to limit deformation of the load cell before the load cell is actually destroyed. The load cell thus is protected against such destruction.

Since the load cell can be deformed only slightly, high precision is required for the adjustment of the gap between the stopper and base which sets the limit of deformation of the load cell (hereinafter referred to as stopper adjustment), and the operation of the stopper adjustment is very cumbersome.

SUMMARY OF THE INVENTION

An object of the invention is to obtain a load cell weighing apparatus, which permits a stopper adjustment to be readily accomplished.

To attain the above object of the invention, there is provided a load cell weighing apparatus, which comprises a base, a load cell having one end secured to the base, a receiving member secured to the other end of the load cell, a load supporting member movable with respect to said base and receiving member, a load being applied to said load supporting member, elastically deforming means provided between the load supporting member and receiving member for transmitting the load applied to the load supporting member to the receiving member, and a stopper co-operating with the base to define the full stroke of movement of the load supporting member.

When a load is applied to the load supporting member of the present load cell weighing apparatus, the elastically deforming means is contracted while at the same time the load cell is deformed, so that the weight of the applied load is measured. When the load applied to the load supporting member is above a predetermined value, contraction of the elastically deforming means is increased and the displacement of the load supporting member is limited by the stopper. Therefore, the load cell is deformed no further and is protected against destruction.

Since the load supporting member is supported by the elastically deforming means, a large stroke of movement of the load supporting member can be provided. Thus, the degree of precision in the stopper adjustment, i.e., adjustment of the full stroke of the load supporting member, may be far less when compared to the prior art load cell weighing apparatus, so that the stopper adjustment can be readily done.

In the load cell weighing apparatus having the above construction according to the invention, it is preferred that the stopper be secured to the load supporting member and have an elongate shape extending from the load supporting member toward the base, that the receiving member have a hole into which the stopper is inserted, and that the elastically deforming means comprise a coil spring wound around the stopper.

With this construction, the various components of the load cell weighing apparatus noted above may be compactly assembled and have simple structures.

Further, in the load cell weighing apparatus according to the invention, it is preferred that the stopper include load supporting member stroke adjusting means provided on one of the base and the load supporting member, for adjusting the stroke of the load supporting member.

With this construction, the stopper adjustment can be done freely and easily at any time.

When the stopper is provided with the load supporting member stroke adjusting means, it is preferred that the stopper further have an elongate extending portion secured to the load supporting member and extending from the load supporting member toward the base, and that the load supporting member stroke adjusting means include a length adjusting screw threadably engaging the extending portion so as to be displaceable relative to the extending portion in the direction of movement of the load supporting member. Alternatively, it is preferred that the load supporting member stroke adjusting means have a length adjusting screw threadably engaging the base so as to be displaceable relative to the base in the direction of movement of the load supporting member.

The load supporting member stroke adjusting means constructed with the length adjusting screw is simple in construction.

Where the stopper further has an elongate extending portion secured to the load supporting member and extending from the load supporting member toward the base, it is preferred that the receiving member have a hole into which the extending portion of the stopper is inserted and that the elastically deforming means comprise a coil spring wound around the extending portion of the stopper.

Such a construction permits compact assembly of the various component parts of the load cell weighing apparatus as noted above.

In the load cell weighing apparatus according to the invention, the base may have an extending portion extending toward the load supporting member, and the stopper may be provided on the extending portion at a position facing the load supporting member.

Again in this case, it is preferred that the stopper include load supporting member stroke adjusting means for adjusting the stroke of the load supporting member, and that the load supporting member stroke adjusting means be constructed with a length adjusting screw threadably engaging the extending portion so as to be displaceable relative to the extending portion in the direction of movement of the load supporting member.

The extending portion is preferably a casing provided on the base and covering at least the load cell and receiving member.

An independent extending portion increases the number of components of the load cell weighing member and hence complicates the construction thereof. Using the casing as the extending portion prevents or alleviates any complication in the construction of the load cell weighing apparatus.

An embodiment of the invention and various modifications thereof will now be described with reference to the drawings.

DETAILED DESCRIPTION OF THE PREFERRED EMBODIMENTS

Figure 1:
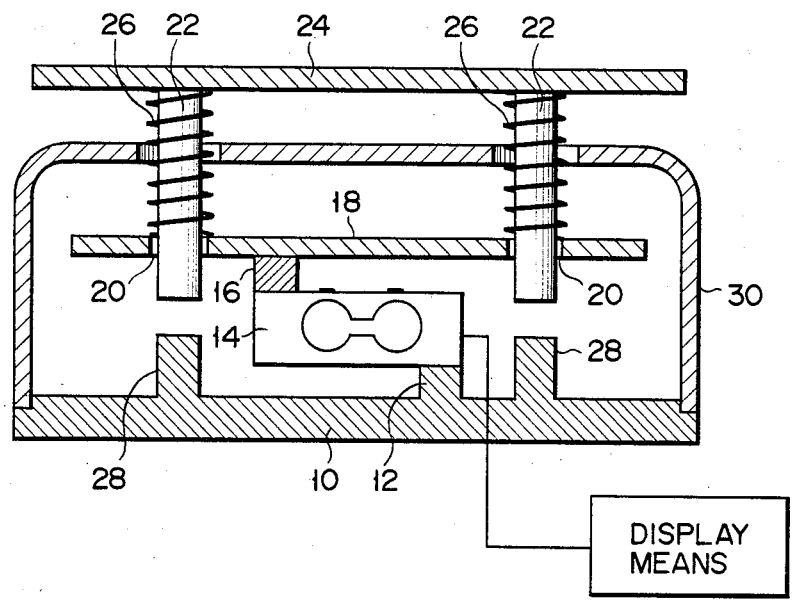
FIG. 1 is a longitudinally sectional view schematically showing an embodiment of the invention in which no load is applied to a load supporting member.

Referring now to FIG. 1, there is depicted a plate-like base 10. Fixed projection 12 is formed at a predetermined position on the upper surface of base 10. One end of load cell 14 is secured to projection 12. Plate-like receiving member 18 is secured through spacer 16 to the other end of load cell 14 so as to extend parallel to base 10. Receiving member 18 has four-through holes 20 (only two through holes being shown) formed at four corners thereof. Vertically extending, elongate stoppers 22, the upper ends of which are secured to load supporting member 24 are inserted into through holes 20. The lower ends of stoppers 22 are spaced apart from the upper surface of base 10. Compression coil spring 26 is wound around each stopper 22 between load supporting member 24 and receiving member 18. Compression coil springs 26 are so mounted on receiving member 18 to make load supporting member 24 locate parallel to base 10. Abutment projections 28 are further formed at positions, corresponding to the lower end of stoppers 22, on the upper surface of base 10. The lower end of each stopper 22 is spaced apart from the upper end of each abutment projection 28 with a predetermined distance. Casing 30, which has through holes for clearing stoppers 22 with compression coil springs 26, is secured to base 10 to cover all the components noted above except for load supporting member 24. Load cell 14 is electrically connected to well-known display means, which converts a change in voltage caused by a deformation of load cell 14 into a value with the corresponding units of weight, such as kg, g, or mg, and displays the converted value. The display means is also accommodated in casing 30.

Figure 2:
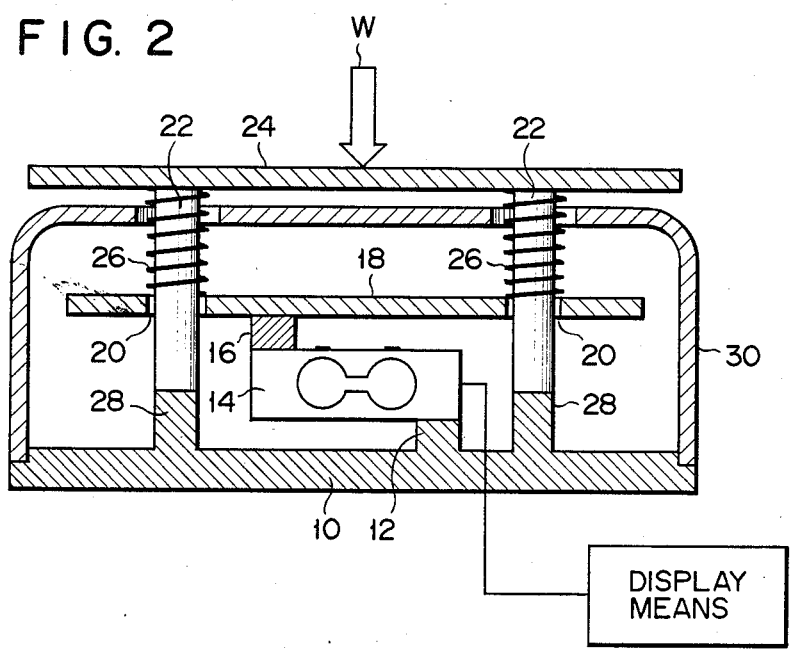
FIG. 2 is a longitudinally sectional view of the same embodiment shown in FIG. 1 but in which a load supporting member is fully displaced, and the outer shape of a deformed load cell looks the same as that when no load is applied because the deformation of the load cell is very slight.

In this embodiment of the load cell weighing apparatus according to the invention, when load W is put on load supporting member 24, compression coil springs 26 are compressed, and also at the same time load cell 14 is deformed so that the weight of the load is measured. The measured weight is converted to a valve with predetermined units of weight and is displayed on the display means. If the weight of load W exerted on load supporting member 24 exceeds a predetermined value (which is 120 to 130% of the upper limit of the value that can be displayed on the display means), compression coil springs 26 are compressed greatly until stoppers 22 are brought into contact with abutment projections 28 of base 10. FIG. 2 shows the load cell weighing apparatus in such a state. When stoppers 22 are brought into contact with abutment projections 28, the deformation of load cell 14 is not increased any more. Thus, it is possible to protect load cell 14 against rupture due to excessive deformation.

In this embodiment of the invention, since compression coil springs 26 are interposed between load supporting member 24 and receiving member 18, the extent of displacement of stoppers 22, i.e., extent of displacement of load supporting member 24, is increased as compared with the prior load-cell weighing apparatus in which a load supporting member is directly secured to a receiving member. Thus, an increased distance is set between the lower end of stoppers 22 and the upper ends of abutment projections 28 of base 10. This allows for a less precise stopper adjustment, that is, adjustment of the stopper abutment may be easily done or unnecessary.

Figure 3:
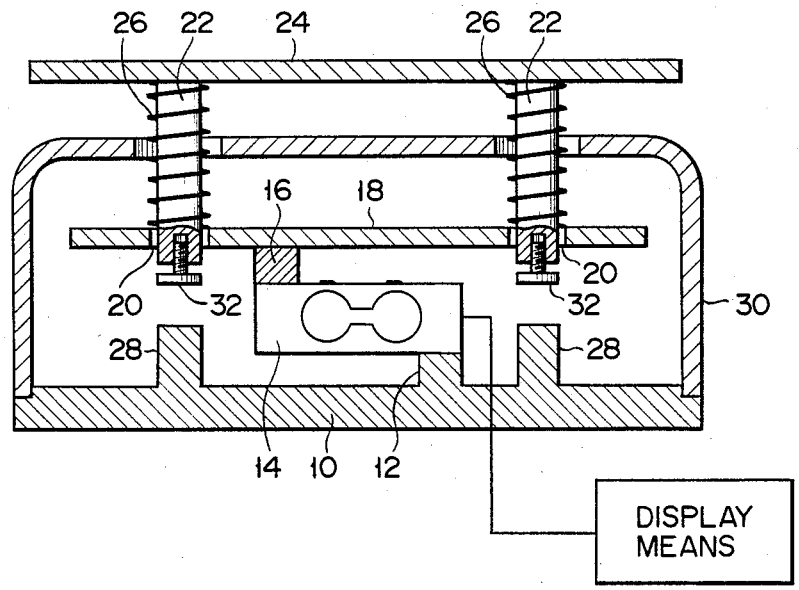
FIG. 3 is a longitudinally sectional view similar to FIG. 1 but schematically showing a first modification of the embodiment of FIG. 1.

FIG. 3 shows a first modification of the preceding embodiment of the invention shown in FIGS. 1 and 2. In the Figure, the same parts in the preceding embodiment are designated by the same reference numerals, and detailed description of these parts is omitted.

In this first modification, length adjusting screw 32 is screwed or threadably engaged in the lower end of each elongate stopper 22 so as to be movable in the moving direction of load supporting member 24 (i.e., the vertical direction in the Figure). The full stroke of load support 24 can be adjusted by turning each length adjusting screw 32 in one direction or the other.

Figure 4:
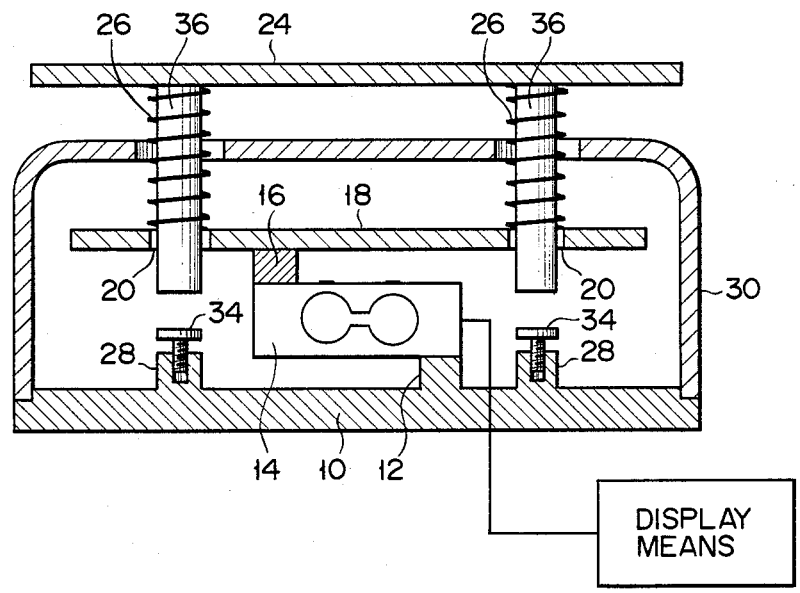
FIG. 4 is a longitudinally sectional view similar to FIG. 1 but schematically showing a second modification of the embodiment of FIG. 1.

FIG. 4 shows a second modification of the embodiment of the invention shown in FIGS. 1 and 2. Again in the Figure, the same parts in the above embodiment are designated by the same reference numerals, and detailed description of these parts is omitted.

In the second modification, length adjusting screw 34 is screwed into the upper end of each abutment projection 28 formed on the upper surface of base 10. Length adjusting screw 34 can be displaced relative to abutment projection 28 in the moving direction of load supporting member 24 (i.e., in the vertical direction in the Figure). The distance between the upper end of length adjusting screw 34 and lower end of each downward extending portion 36 extending from lower surface of load supporting member 24 toward base 10, i.e., the full stroke of load supporting member 24, can be adjusted by turning each length adjusting screw 34 in one direction or the other.

Figure 5:
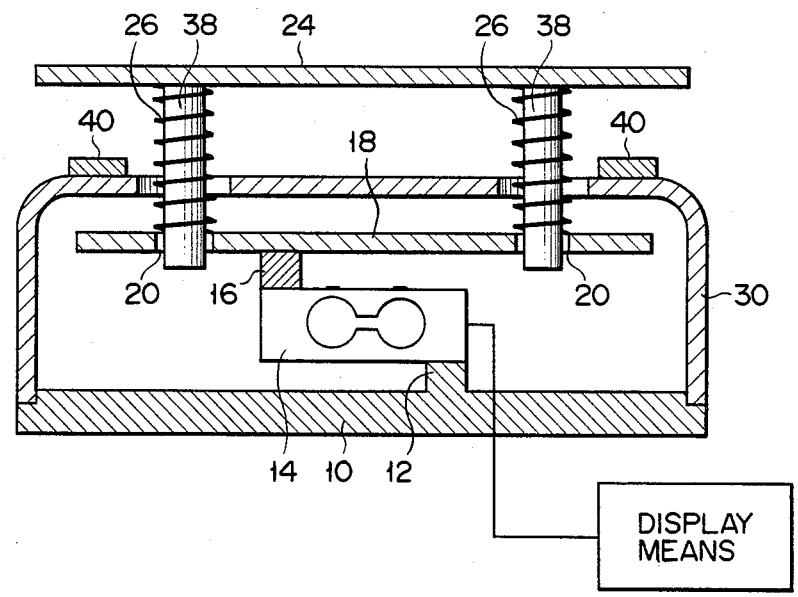
FIG. 5 is a longitudinally sectional view similar to FIG. 1 but schematically showing a third modification of the embodiment of FIG. 1.

FIG. 5 shows a third modification of the embodiment of the invention shown in FIGS. 1 and 2. Again in the Figure, the same parts in the above embodiment are designated by the same reference numerals, and detailed description of these parts is omitted.

In this modification, downward extending portions 38 extending from the lower surface of load supporting member 24 toward base 10 do not function as such stoppers, but they only serve as means for holding compression coil springs 26 and also as means for guiding the movement of load supporting member 24. Base 10 has no abutment projections facing downward extending portions 38 of load supporting member 24.

In this modification, abutment projections 40 are formed on or secured to portions of casing 30 which face the lower surface of load supporting member 24. Abutment projections 40 serve as stoppers to define the full stroke of load supporting member 24.

Figure 6:
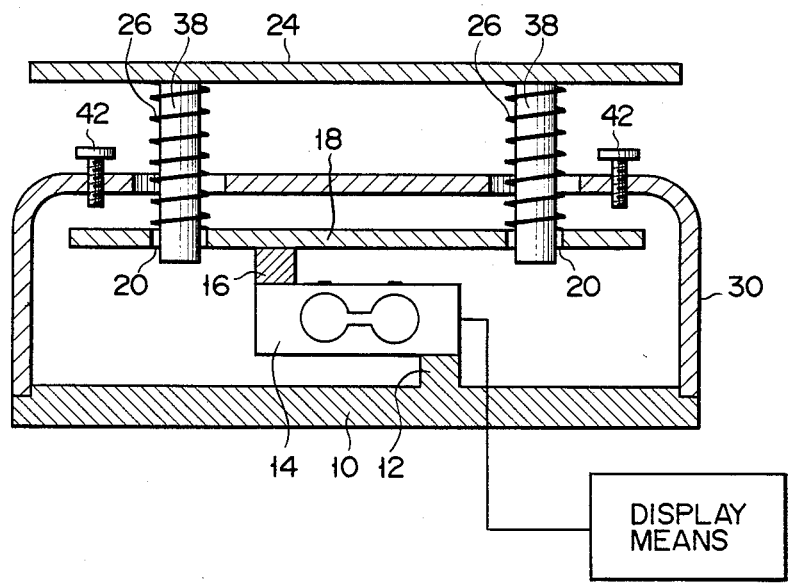
FIG. 6 is a longitudinally sectional view similar to FIG. 1 but schematically showing a fourth modification of the embodiment of FIG. 1.

FIG. 6 shows a fourth modification of the embodiment of the invention shown in FIGS. 1 and 2. Again in the Figure, the same parts in the above embodiment are designated by the same reference numerals, and detailed description of these parts is omitted.

In this modification, length adjusting screws 42 are provided in lieu of abutment projections 40 in the third modification shown in FIG. 5. Each length adjusting screw can be displaced relative to casing 30 in the moving direction of load supporting member 24, i.e., in the vertical direction in the Figure. These length adjusting screws 42 serve as stoppers to define the full stroke of load supporting member 24, i.e., the full stroke of load supporting member 24 can be adjusted by turning each length adjusting screw 42 in one direction or the other. The rest of the structure is the same as in the third modification shown in FIG. 5.

The embodiment and modifications thereof described above, are given for the purpose of explaining the invention and without any sense of limiting the invention. Various further changes and modifications can be made without departing from the scope of the invention.

For example, fixed projection 12, to which one end of load cell 14 is secured, and abutment projections 28, which are provided on the upper surface of base 10 at positions corresponding to the lower end of stoppers 22 or downward extending portions 36, may be independently formed from a different material from that of base 10 and secured to the upper surface of the base by using well-known securing means.

Further, compression coil springs 26 may be replaced with other elastically deformable means made of rubber, and compression springs having various shapes other than coil shape may be used.

Furthermore, the abutment end of each length adjusting screw 32, 34 or 42 may have various sectional profiles other than a flat profile.

What is claimed is:

1. A load cell weighing apparatus, comprising:
   a base;
   a load cell having one end secured to said base;
   a receiving member secured to the other end of said cell;
   a load supporting member movable with respect to said base and said receiving member, wherein a load to be weighed is applied to the load supporting member;
   elastically deforming means provided between and directly contacting said load supporting member and said receiving member for directly transmitting the load applied to said load supporting member to said receiving member; and
   a stopper formed by an elongated portion secured to said load supporting member and having its direction of elongation extending from said load supporting member toward said base, wherein said stopper coooperates with said base to define a full stroke of movement of said load supporting member and avoids destructive deformation of said load cell by the load applied to said load supporting member.

2. The load cell weighing apparatus according to claim 1, wherein said stopper includes load supporting member stroke adjusting means provided on one of said base and said load supporting member for adjusting the stroke of said load supporting member.

3. The load cell weighing apparatus according to claim 2, wherein:
   said load supporting member stroke adjusting means includes a length adjusting screw threadably engaging said elongate extending portion so as to be displaceable relative to said elongate extending portion in the direction of movement of said load supporting member.

4. The load cell weighing apparatus according to claim 3, wherein:
   said receiving member has a hole into which said elongate extending portion of said stopper is freely received;
   the moving direction of said elongate extending portion and said load supporting member together being guided by said hole; and
   said elastically deforming means is a coil spring wound around said elongate extending portion of said stopper.

5. The load cell weighing apparatus according to claim 2, wherein said load supporting member stroke adjusting means includes a length adjusting screw threadably engaged in said base so as to be displaceable relative to said base in the direction of movement of said load supporting member.

6. The load cell weighing apparatus according to claim 1, wherein:
   said receiving member has a hole into which said elongate extending portion of said stopper is freely received, the moving direction of said elongate extending portion and said load supporting member together being guided by said hole; and
   said elastically deforming means is a coil spring wound around said elongate extending portion of said stopper to abut said load supporting member at one end of said spring and to abut said receiving member at the other end of said spring.

7. A load cell weighing apparatus, comprising:
   a base;
   a load cell having one end secured to said base;
   a receiving member secured to the other end of said load cell;
   a load supporting member movable with respect to said base and said receiving member, wherein a load to be weighed is applied to the load supporting member;
   elastically deforming means provided between said load supporting member and said receiving member for transmitting the load applied to said load supporting member to said receiving member;
   a casing provided on said base and extending toward said load supporting member to cover at least said load cell and said receiving member; and a stopper provided on said casing at a position facing said load supporting member, to define a full stroke of movement of said load supporting member and avoid destructive deformation of said load cell by the load applied to said load supporting member.

8. The load cell weighing apparatus according to claim 7, wherein said stopper includes load supporting member stroke adjusting means for adjusting the stroke of movement of said load supporting member.

9. The load cell weighing apparatus according to claim 8, wherein said load supporting member stroke adjusting means includes a length adjusting screw threadably engaged in said casing so as to be displaceable relative to said casing in the direction of movement of said load supporting member.

* * * * *